Patented July 16, 1935

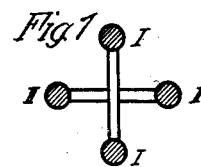 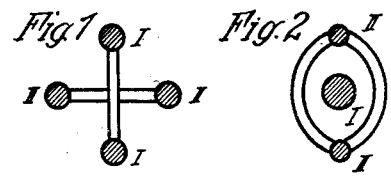 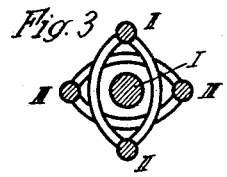
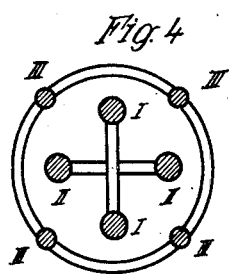 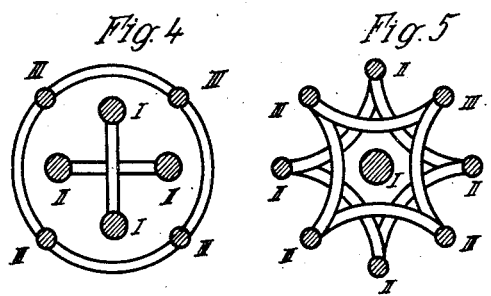 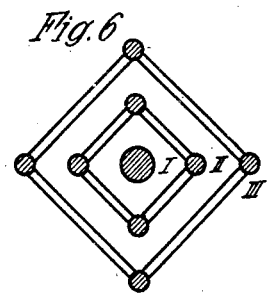
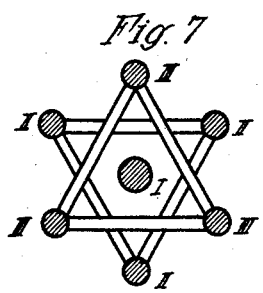 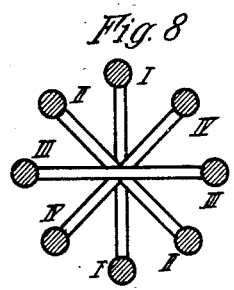 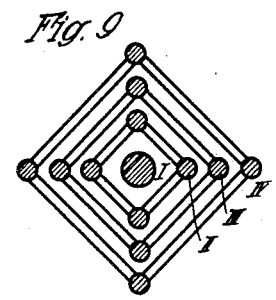
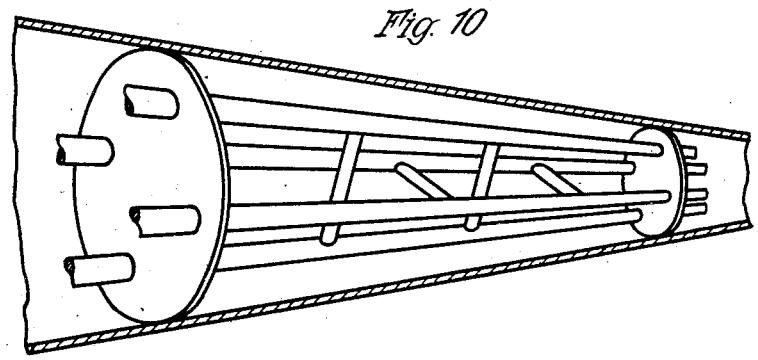

2,008,109

UNITED STATES PATENT OFFICE 2,008,109

HEAVY CURRENT CONDUCTOR SYSTEM, MORE PARTICULARLY FOR RUSHES OF HEAVY CURRENTS

Carl Reher, Berlin, Germany, assignor to Siemens-Schuckertwerke Aktiengesellschaft, Berlin-Siemensstadt, Germany, a corporation of Germany Application May 12, 1931, Serial No. 536,734 In Germany May 16, 1930

5 Claims. (Cl. 173—13)

My invention relates to a system of conductors for heavy currents and more particularly for rushes of heavy current.

Two conductors carrying currents of the same or opposite directions attract or repel each other, respectively, the force exerted being proportional to the square of the current and approximately inversely proportional to the distance between the two conductors. With heavy currents and short distances the said force may, therefore, rise to considerable values. The supporting arrangements necessary to resist these electro-mechanical forces depend upon the so-called impulse or rush currents, occurring for instance during a short circuit, i. e. upon the current peaks occurring immediately after the short circuit. In all cases, therefore, in which heavy current rushes are to be expected, mechanically very strong insulators are necessary to support the conductors, particularly as the action of the force exerted has the effect of a blow. Particular difficulties are encountered in supporting the conductors in cables insulated with compressed gas and similar systems of conductors, as, owing to the good insulating properties of the compressed gases, the distances between the conductors need only be short, a fact, which for economical reasons will always be made use of.

According to my invention, the electromagnetic and the electrostatic forces, of which the latter are as a rule of a lower order than the electromagnetic forces, may be kept away from the supports by splitting one, or more, or all of the conductors into two or more branch conductors connected in parallel and by disposing these branch or divisional conductors at points in the composite conductor system, at which the effective electro-mechanical forces mutually exerted by the individual conductors and produced by the flowing currents are mutually balanced. This is best accomplished by arranging the divisional conductors symmetrically about a central axis (the axis of the system), and symmetrically with respect to one another, the divisional conductors having the same potential or phase being connected with one another by means of cross connections. Consequently in such an arrangement, the resultant of the electro-mechanical forces exerted between the conductors or the groups of conductors of the individual phases are zero for any distribution of the current among the different phases.

These forces between the different phases, therefore, cannot be effective any more, but on the other hand, the said cross connections must take forces exerted between the different branch conductors of a phase, the cross connection being as a rule stressed only in tension. Contrary to prior art connections which could also be used between conductors of different phases in a normal system of conductors, where the conductors have the tendency to separate, the cross-connections in my case connect points of equal potential. They may therefore consist of metal so that they are capable of withstanding considerable forces. But also if they are made of insulating materials, the advantage remains that these cross connections are no more exposed to flash-over stresses.

The cross connections may be placed at suitable intervals, e. g. also at smaller intervals than the supports, along the axis of the system. In Figs. 1 to 7 of the accompanying drawing, a number of different electro-mechanically balanced conductor systems, according to the invention, are illustrated for two-wire or three-wire systems, which are practically those coming mostly into consideration. Fig. 8 shows a four-wire system, in which no forces are exerted when current flows in the conductors I and III but not in II and IV. The system is, however, not free from forces when I and II carry current and III and IV do not. The four-wire system according to Fig. 9 is, however, free from resulting forces between the groups of conductors for any distribution of current.

The same applies to the aforeillustrated two-wire and three-wire systems. The condition for the balance of forces is always fulfilled, when all the groups of conductors are arranged symmetrically to two planes at right angles to one another and intersecting in the axis of the system. With the examples according to Figs. 1, 3, 4, 5, 7 and 8, the branch conductors of a phase are alternately connected in the direction of the axis of the system, e. g. as represented in perspective in Fig. 10.

The arrangements according to Figs. 1, 4 and 5 are completely stable, i. e. through small asymmetries in the mounting, forces are produced which always tend to lessen the said asymmetries. These arrangements are for this reason of particular advantage for outdoor busbar installations. In compressed-gas insulated cables, however, completely stable arrangements need not be insisted upon, as an arrangement stabilizing the whole system automatically is not possible with regard to the iron sheath. As far as an arrangement for an electro-mechanical balance is at all necessary, the simplest arrangement possible is chosen.

I claim as my invention:

1. Arrangement of electric conductors for heavy currents, comprising a plurality of main conductors carrying currents producing interacting fields, at least one of said conductors being subdivided into parallel-connected divisional conductors, means positioned at intervals along the conductor system for positively spacing all conductors apart from one another, so that the conductors are suspended between said positive spacing means, each of said conductors being disposed at a point in the system at which the effective electro-mechanical forces of the composite system, produced by the flowing currents, are substantially balanced.

2. Arrangement of electric conductors for heavy currents, comprising a plurality of main conductors carrying currents producing interacting fields, at least one of said conductors being subdivided into parallel-connected divisional conductors, means positioned at intervals along the conductor system for positively spacing all conductors apart from one another, so that the conductors are suspended between said positive spacing means, each of said conductors being disposed at a point in the system at which the effective electro-mechanical forces of the composite system, produced by the flowing currents, are substantially balanced, and braces for the suspended divisional conductor portions, arranged transversely between the constituent divisional conductors of a main conductor.

3. Arrangement of electric conductors for heavy currents comprising a plurality of suspended main conductors forming a conductor system, at least one of said main conductors being subdivided into parallel-connected divisional conductors, said divisional conductors being arranged symmetrically to two imaginary longitudinal planes intersecting at right angles in the common axis of the main conductor system, divisional conductors of equal potential having transverse braces.

4. Arrangement of electric conductors for heavy currents comprising a plurality of main conductors carrying currents producing interacting fields, and forming a conductor system, all but one of said main conductors being subdivided into parallel-connected divisional conductors, means positioned at intervals along the conductor system for positively spacing all conductors apart from one another, so that the conductors are suspended between said positive spacing means, said divisional conductors surrounding the undivided main conductor and being disposed at points in the composite system at which the effective electro-mechanical forces of the system produced by the flowing currents are substantially balanced.

5. Arrangement of electric conductors for heavy currents comprising a plurality of main conductors carrying currents producing interacting fields, and forming a conductor system, all but one of said main conductors being subdivided into parallel-connected divisional conductors, means positioned at intervals along the conductor system for positively spacing all conductors apart from one another, so that the conductors are suspended between said positive spacing means, said divisional conductors surrounding the undivided main conductor and being disposed at points in the composite system at which the effective electro-mechanical forces of the system produced by the flowing currents are substantially balanced, and conducting braces for the suspended divisional conductor portions, arranged transversely between the constituent divisional conductors of a main conductor.

CARL REHER.